United States Patent [19]

Rader

[11] Patent Number: 4,513,110

[45] Date of Patent: Apr. 23, 1985

[54] METHOD OF TREATING DIENE RUBBER AND IMPROVED RUBBER COMPOSITIONS

[75] Inventor: Charles P. Rader, Akron, Ohio

[73] Assignee: Monsanto Company, St. Louis, Mo.

[21] Appl. No.: 502,875

[22] Filed: Jun. 9, 1983

[51] Int. Cl.$^3$ ............ C08L 7/00; C08L 9/00; C08L 9/06; C08L 13/00
[52] U.S. Cl. .................. 524/432; 524/357; 524/358; 524/526; 524/571; 524/572; 524/575; 525/236; 525/300; 525/383; 525/301
[58] Field of Search ............ 525/236, 300, 383, 301; 524/526, 572, 432, 575, 357, 358; 527/571

[56] References Cited

U.S. PATENT DOCUMENTS

| | | |
|---|---|---|
| 1,918,328 | 7/1933 | Fisher .......................... 260/773 |
| 2,170,191 | 8/1939 | Fisher .......................... 260/796 |
| 2,234,202 | 3/1941 | Spence ........................ 260/773 |
| 3,151,161 | 9/1964 | Mullins et al. . |
| 3,225,100 | 12/1965 | Mullins et al. . |
| 3,565,841 | 2/1971 | Tarney et al. ............... 525/236 |
| 4,198,324 | 4/1980 | Lal et al. .................... 525/236 |
| 4,316,825 | 2/1982 | Wirth ........................... 525/236 |

FOREIGN PATENT DOCUMENTS 870053  5/1971  Canada ............................ 525/236

OTHER PUBLICATIONS

D. Spence, J. D. Ferry–"Enhanced Polymerization and Depolymerization of Natural Rubber by Quinones and Related Compounds", J. Am. Chem. Soc. 59, 1648 (1937).
M. Pike, W. F. Watson–"Mastication of Rubber. I. Mechanism of Plasticizing by Cold Mastication", J. Polymer Science, 9 229 (1952).
R. G. Bauman, J. W. Born–"The Mechanism of Radiation Damage to Elastomers. I. Chain Scission and Antirad Action", J. Applied Pol. Sci. 1 351 (1959).
W. Watson–"Cold Mastication of Rubber", Transactions, I.R.I., 29, 32 (1953).

Primary Examiner—Allan M. Lieberman
Attorney, Agent, or Firm—Gordon B. Seward

[57] ABSTRACT

Treatment of diene rubber with a diketo compound, in which the keto groups are part of a six-carbon hydrocarbon ring containing carbon-to-carbon unsaturation, or a tautomer of the compound, is performed at temperatures above 130° C. Rubber compositions treated in this manner exhibit increased green strength, decreased plasticity, and, when vulcanized, decreased hysteresis.

35 Claims, No Drawings

METHOD OF TREATING DIENE RUBBER AND IMPROVED RUBBER COMPOSITIONS

BACKGROUND OF THE INVENTION

This invention relates to a method for treating diene rubber to improve the properties of the rubber, and to rubber compositions having improved green strength or plasticity properties, or lower hysteresis when cured.

The introduction of synthetic diene rubber as a total or partial replacement for natural rubber in portions of pneumatic tires and other rubber articles presented problems in that the behavior of the synthetic materials differed from that of natural rubber. Significant areas of difference concerned green strength and plasticity. Typically, unvulcanized synthetic diene rubber has significantly lower green strength and higher plasticity than does natural rubber. This difference has presented problems; for example, articles such as tires failed to maintain their structural integrity during handling and shaping prior to vulcanization. As a result, searching for improvements in the green strength and plasticity of rubber compounds containing synthetic rubber has been a continuing effort.

Synthetic polyisoprene has been produced which resembles natural rubber closely, consisting of essentially all cis-1,4-polyisoprene. Perhaps the most significant difference between synthetic polyisoprene and natural rubber is that the former has considerably less green strength. Thus, much of the effort towards green strength improvement concerns synthetic polyisoprene. Other synthetic diene rubbers which are widely used are polybutadiene and styrene-butadiene copolymer rubber (SBR).

Hysteresis in a cured (vulcanized) rubber compound is directly related to heat build-up. High-hysteresis rubber, on repeated flexing, rapidly builds up heat. In certain applications, such as in the treads of truck tires, the degree of heat build-up in use can be such that thick sections in the treads are degraded to the point of failure, resulting in separations and delaminations, often to the extent that the entire tread peels off the tire. The synthetic diene rubber type used in the tire normally exhibits higher hysteresis than natural rubber, so that even in blends with natural rubber the synthetic diene rubber gives compositions having a higher heat buildup than all-natural rubber compositions.

Efforts to improve the properties of diene rubber include the incorporation of nitrosoanilinoalkane compounds therein, as shown in U.S. Pat. Nos. 3,151,161 and 3,225,100. Problems of dispersion of these materials into rubber have been encountered, made more acute by the fact that relatively small amounts of them are generally used.

SUMMARY OF THE INVENTION

It is an object of this invention to provide a method of treating diene rubber so as to improve its properties of green strength, plasticity and hysteresis. It is another object of this invention to provide an improved rubber composition, which shows increased green strength, decreased plasticity, or, when cured, reduced hysteresis.

These and other objects are realized in the instant invention by a method of treating diene rubber, in the presence of a modification-promoting amount of a compound selected from diketo compounds wherein the keto groups are in the ortho positions of a six-carbon hydrocarbon ring containing at least one site of carbon-to-carbon unsaturation, or tautomers of said compounds, at an appropriate temperature above 130° C. for sufficient time to impart improved properties to the rubber.

The instant invention also resides in an improved diene rubber composition, which has been treated at an appropriate temperature above 130° C. with a modification-promoting amount of a compound selected from diketo compounds wherein the keto groups are in the ortho positions of a six-carbon hydrocarbon ring containing at least one site of carbon to carbon unsaturation, or tautomers of said compounds, for sufficient time to impart improved properties of the rubber.

The diketo compounds of the invention include ortho quinones derived from benzene, naphthalene, phenanthrene and other cyclic compounds. Among these compounds are orthobenzoquinone, 1,2-naphthoquinone and 9,10-phenanthrenequinone. One or more other substituents, including chloro- and hydroxy groups, can be present on the six-carbon ring, so the compounds also include 3-chloro-1,2-benzoquinone, 4-chloro-1,2-benzoquinone, 3,4-dichloro-1,2-benzoquinone, 3,5-dichloro-1,2-benzoquinone, 3,6-dichloro-1,2-benzoquinone, 3,4,5-trichloro-1,2-benzoquinone, 3,4,6-trichloro-1,2-benzoquinone, and tetrachloro-1,2-benzoquinone. Chloro-substituted 1,2-naphthoquinones are also included, having from one to six chlorine atoms attached, variously, at the 3,4,5,6,7 and 8 positions on the naphthalene ring. Also included are chloro-substituted diketo compounds based on other fused-ring structures, with the limitation that the keto groups are at adjacent positions on a six-carbon ring which contains at least one site of carbon to carbon unsaturation.

Hydroxy-substituted compounds include various hydroxy-substituted 1,2-benzoquinones and 1,-naphthoquinones, among others, in a similar manner as the chloro-substituted compounds described above.

The tautomers of the ortho diketo compounds, which are themselves included in the active compounds of the invention, are those in which an enol form of the ortho diketo compound exists in tautomeric equilibrium with the ortho diketo compound. For example, a tautomer which has been found very effective in the method and composition of the invention is 2,5-dihydroxyparabenzoquinone, which has the following structural formula:

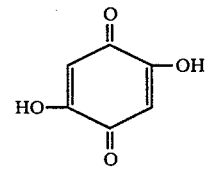

Although this compound does not have its keto substituents in the ortho position, it can be considered to be a tautomer of the following compound:

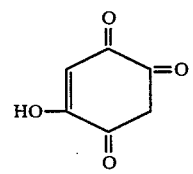

In a similar manner, 2-hydroxy-4-naphthoquinone,

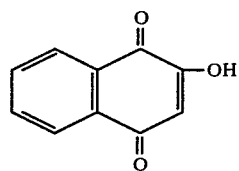

can be a tautomer of the following compound:

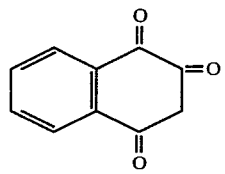

The tautomer, 2-hydroxy-1,4-naphthoquinone, has also been found to be very effective in the method and composition of the invention. Clearly, other tautomeric forms exist in equilibrium with the ortho diketo compounds of the invention, and the two tautomers described above are merely illustrative of them.

The amount of the compound used will depend on the nature of the compound itself (activity, molecular weight, etc.), on the type of diene rubber to be treated, on the time and temperature employed and on the desired magnitude of the improvement in properties of the diene rubber.

Preferably, the compound is present in an amount of from 0.1 to 20 parts, and more preferably, from 0.2 to 5 parts by weight per 100 parts of diene rubber by weight.

Optionally, maleic acid or maleic anhydride can be present in the diene rubber in addition to the compound, and will enhance the improvement of the properties of the rubber. If present, the maleic acid or anhydride is used in an amount of from 0.2–5 parts by weight per 100 parts of diene rubber by weight.

Also optional is the incorporation of a small amount of sulfur or vulcanization accelerator during the treatment. Relatively low amounts of these materials should be used in order to avoid pre-cure or scorch of the rubber. Generally, about 0.1 to 0.5 parts of sulfur or from about 0.1 to 1.0 parts of accelerator is sufficient, with improved results realized in many instances.

By diene rubber is meant an elastomer which is a polymer from diene monomer, either a natural or synthetic polymer, including mixtures of two or more of natural and/or synthetic polymers. Natural diene rubber includes Hevea rubber (in the form of smoked sheet, crepe or other typical forms), guayule, and other naturally occurring diene rubbers. Synthetic polymers which are included in the definition of "diene rubber" include polymers from isoprene and butadiene, either homopolymers or copolymers with one or more comonomers, which can be dienes or other polymerizable materials. For example, copolymers of isoprene or butadiene with styrene, acrylonitrile, isobutylene, or unsaturated carboxylic acids and esters such as maleic, fumaric, itaconic, acrylic and methacrylic acids, and methyl-methacrylates are included. EPDM rubbers (polymers from ethylene, propylene and a non-conjugated diene monomer), butyl rubbers (polymers from isobutylene and a diene monomer) and chlorobutyl rubbers are also included.

The invention finds a particular utility in use with synthetic polyisoprene of a high cis-1,4 content, and with blends thereof with polybutadiene or SBR (styrene/butadiene copolymer rubber).

Treatment of the diene rubber means incorporating the compound into the rubber, with good dispersion, and maintaining the mixture at the appropriate temperature (above 130° C.) for sufficient time to permit the modification to occur. Preferably, the temperature should be at least 150° C., more preferably from 160° to 210° C. A convenient method of treating involves admixture of the compound into the rubber using the type of high-shear equipment normally used for mixing rubber, such as rubber mills, and preferably, internal mixers exemplified by Banbury mixers and the like. Such mixing produces a temperature rise in the rubber composition which can be controlled within the desired temperature range. Alternatively, the compound can be incorporated into the diene rubber at a relatively low temperature (below 130° C.) and then the mixture can be heated to the appropriate higher temperature and held for the required time.

Preferably, the treatment time will be from 0.1 to 20 minutes, and more preferably from 1 to 10 minutes. Shorter treatment times than the preferred minimum may result in insufficient improvement in the desired properties, and longer treatment times than the preferred maximum may be harmful to the rubber. As with the level of the compound, both optimum times and optimum temperatures for a specific compound can easily be determined by a limited number of experiments.

Other rubber compounding ingredients can optionally be present during the treatment, and the presence of carbon black and/or non-black fillers is preferred. Because of the conditions employed, however, the complete vulcanization system should preferably not be present during the treatment, as it could result in a premature curing or scorch of the diene rubber compound. If it is desired to have black or non-black fillers present in the diene rubber compound, particular advantage is realized by having the fillers present during the treatment step. This method can produce interaction between the fillers and the diene rubber so as to obtain better physical properties in the vulcanized compounds. These better physical properties are evidenced in improvements in hysteresis and stress-strain properties, among other properties.

Often, when treating the diene rubber, amounts of the compound will be substantially less than the maximum preferred levels set forth above, such as, for example, less than three parts by weight per 100 parts of diene rubber by weight; but higher amounts can be employed, especially if a "masterbatch" technique is used. This technique can involve treating only a portion of the diene rubber, then subsequently blending the untreated portion into the treated portion. From ten parts or less up to 1,000 parts or more additional rubber can be admixed to the treated rubber, as desired. The additional rubber can be the same as, or different from the rubber originally treated. The masterbatch technique can be effective in providing more efficient use of the masticating equipment, thus allowing higher throughput of rubber.

DETAILED DESCRIPTION

A more complete understanding of the invention may be realized by reference to the following examples, in which all parts are by weight, unless otherwise specified.

The diketo compounds of the invention are well known in the art. Many are commercially available, and all of the preferred compounds are commercially available.

In evaluating the rubber compositions of the invention, one important measurement is their green strength. Green strength in an elastomer is its resistance, before vulcanization, to deformation or fracture.

Green strength measurements are performed using a standard tensile testing machine. Samples of the rubber composition to be tested are pressed into slabs approximately three millimeters in thickness, from which slab specimens are die-cut measuring about 20.3×2.4 c.m. The specimens are bench marked (to a test length of 2.54 cm.) in the center, and the exact width and thickness is measured. Specimens are pulled at a crosshead speed of 50.8 cm. per minute, with the stress reported at 300% elongation and at 1200, or break. Stress values are calculated based on the original, cross-section area of each specimen. In most instances, the green strength of the masterbatch (before adding the final curatives) and that of the fully compounded rubber composition are measured.

The tensile set of the uncured rubber compound is another measurement which is indicative of its behavior during shaping. Tensile set is measured according to the procedure described in ASTM D-412, paragraph 13, and can be found in Volume 37 of the 1982 ASTM standards at page 62. Briefly, specimens are elongated 100%, held for 5 minutes, and then released. After an additional 5 minute rest period, the permanent elongation is measured, and the tensile set is calculated.

To evaluate hysteresis properties in a vulcanized rubber compound, the Lupke rebound test is used. This test is described in the Vanderbilt Rubber Handbook, 1968 Edition, pages 315 and 316.

The method of the invention is tested in a standard masterbatch formulation as set forth below:

| MATERIAL | WEIGHT |
|---|---|
| Synthetic Polyisoprene[1] | 100.0 |
| HAF Carbon Black, N330 | 50.0 |
| Circosol 4240 Oil | 5.0 |
| Zinc Oxide | 5.0 |
| Stearic Acid | 1.0 |
| Antidegradant[2] | 2.0 |
| TOTAL | 163.0 |

[1]Natsyn 2200
[2]N—(1,3-dimethylbutyl)-N'—phenyl-p-phenylenediamine

To the masterbatch is added a test compound, as follows. Masterbatch compounds are mixed and masticated in a laboratory Banbury mixer according to the following schedule:

1. Charge rubber and test compound; mix 1 minute.
2. Charge ½ of carbon black; mix 1 minute.
3. Charge oil and remainder of carbon black; mix 1 minute.
4. Charge remaining ingredients; mix 1 minute.
5. Sweep down; mix 1 minute.
6. Dump. Actual rubber temperature (using a needle thermocouple) should be 170°–210° C.

Masterbatch samples, mixed as above, are tested for uncured properties, such as green strength and tensile set. To the masterbatch is added, on a mixing mill, 2.0 parts by weight of sulfur and 0.8 parts by weight of an accelerator, t-butyl benzothiazolesulfenamide.

EXAMPLE I

In the standard formulation set forth above, 1,2-naphthoquinone is tested, using the mixing schedule described. The proportions and the test results are set forth in Table 1, with separate results for the masterbatch and for the complete compound, containing sulfur and accelerator.

TABLE 1

| STOCK | A | B | C |
|---|---|---|---|
| 1,2-Naphthoquinone | — | 1.0 | 1.0 |
| MBTS | — | — | 0.2 |
| Banbury dump temp., °C. | 199 | 200 | 202 |
| Sulfur | 2.0 | 2.0 | 2.0 |
| Accelerator | 0.8 | 0.8 | 0.8 |
| Green Strength Masterbatch | | | |
| @ 300% Elongation, MPa | 0.18 | 0.73 | 0.41 |
| @ Break, MPa | 0.16 | 1.52 | 1.16 |
| Elongation at Break, % | 1200+ | 420 | 600 |
| Completed Compound | | | |
| @ 300% Elongation, MPa | 0.15 | 0.56 | 0.32 |
| @ Break, MPa | 0.11 | 1.38 | 0.99 |
| Elongation at Break, % | 1200+ | 490 | 630 |
| Tension Set, % | | | |
| Masterbatch | 59.5 | 11.0 | 26.5 |
| Completed Compound | 62.5 | 14.5 | 31.5 |

The results in Table 1 show that the addition of 1.0 parts of 1,2-naphthoquinone by weight to the standard formulation produces substantial improvements in both the green strength and tension set of the rubber. The addition of MBTS at the 0.2 part level is counterproductive. The test results for the completed compound are poorer than for the masterbatch in each stock, but the pattern of improvement is unchanged.

EXAMPLE II

Using the same formulation and procedure as in Example I, 1,4-naphthoquinone is compared for its effect. Proportions and results are set forth in Table II.

TABLE II

| | D | E | F | G |
|---|---|---|---|---|
| 1,4-Naphthoquinone | — | 1.0 | 1.0 | — |
| MBTS | — | — | 0.2 | — |
| 1,2-Naphthoquinone | — | — | — | 0.5 |
| Banbury Dump Temp., °C. | 202 | 204 | 203 | 204 |
| Sulfur | 2.0 | → | → | → |
| Accelerator | 0.8 | → | → | → |
| Green Strength Masterbatch: | | | | |
| @ 300% Elongation, MPa | 0.20 | 0.18 | 0.14 | 0.51 |
| @ Break, MPa | 0.18 | 0.15 | 0.11 | 1.29 |
| Elongation at Break, % | 1200+ | 1200+ | 1200+ | 520 |
| Completed Compound: | | | | |
| @ 300% Elongation, MPa | 0.14 | 0.14 | 0.13 | 0.40 |
| @ Break, MPa | 0.09 | 0.09 | 0.04 | 0.92 |
| Elongation at Break, % | 1090 | 1200+ | 840 | 550 |
| Lupke Rebound | | | | |
| 1st Rebound | 72.5 | 73 | 73 | 77 |
| 3rd Rebound | 40.5 | 40.5 | 41.5 | 48.5 |
| 5th Rebound | 23 | 22.5 | 23.5 | 32 |
| Tension Set, % | | | | |
| Masterbatch | 56.0 | 62.5 | 64.0 | 24.0 |
| Completed Compound | 52.5 | 60.0 | 61.0 | 11.0 |

The results in Table II show that 1,4-naphthoquinone has no positive effect, at the 1.0 part level, on the properties of the rubber. The combination of 0.2 parts MBTS therewith has a negligible effect. However, even at the 0.5 part level, 1,2-naphthoquinone shows substantial effect on the rubber properties, almost as great as in Table 1, at the 1.0 part level.

EXAMPLE III

A number of different diketo compounds are evaluated as treating agents in the standard formulation, again following the procedure used in Example I. All the compounds are evaluated at the 1.0 part level except acenaphthenequinone and 1,2-dihydroxy-9,10-anthroquinone, which are used at the 0.5 part level. The results are set forth in Table III. The control results are expressed as a range within which the various control samples fell.

The last four compounds listed in Table III are outside the scope of the invention. Acenaphthenequinone contains two keto groups, but they are attached to a five-carbon ring. 9,10-Anthroquinone and its dihydroxy derivative have their keto groups in the para position, with no possible tautomers within the scope of the invention. 1,4-Naphthoquinone also has its keto groups in the para position.

The last four listed test compounds (which are outside the scope of the invention) are all ineffective in improving the properties of the rubber.

EXAMPLE IV

The effect of 1,2-naphthoquinone on other diene polymers is investigated, specifically, natural rubber and oil-extended SBR. The natural and synthetic polyisoprene formulations are the same as that of Example I, except that N660 carbon black is used. The SBR contains 37.5 parts oil, so no additional oil is included in its formulation. Essentially the same mixing procedure was used as in Example I. Also, with the SBR formulation a different antioxidant (polymerized 2,2,4-trimethyl-1,2-dihydroquinoline) is used. Nitrol ® promoter, used in Stock M, is 33-⅓% N-(2-methyl-2-nitropropyl)-4-nitrosoaniline on an inert carrier.

Proportions and test results are set forth in Table IV.

TABLE IV

| STOCK | H | I | J | K | L | M | N | O |
|---|---|---|---|---|---|---|---|---|
| Natsyn Formulation | 163.0 | → | — | — | — | — | — | — |
| Natural Rubber Formulation | — | — | 163.0 | → | — | — | — | — |
| SBR Formulation | — | — | — | — | 195.5 | → | → | → |
| Nitrol | — | — | — | — | — | 1.0 | — | — |
| 1,2-Naphthoquinone | — | 1.0 | — | 1.0 | — | — | 0.5 | 0.5 |
| Maleic Acid | — | — | — | — | — | — | 1.0 | — |
| Maleic Anhydride | — | — | — | — | — | — | — | 1.0 |
| Sulfur | 2.0 | → | → | → | 2.5 | → | → | → |
| Accelerator | 0.8 | → | → | → | 1.2 | → | → | → |
| Banbury Dump Temp., °C. | 200 | 201 | 200 | 199 | 202 | 203 | 204 | 203 |
| Green Strength | | | | | | | | |
| Masterbatch: | | | | | | | | |
| @ 300% Elong., MPa | 0.13 | 0.25 | 0.45 | 0.58 | 0.27 | 0.49 | 0.63 | 0.75 |
| @ Break, MPa | 0.08 | 0.59 | 0.88 | 1.44 | 0.07 | 0.53 | 0.81 | 0.98 |
| % Elongation | 1200 | 770 | 520 | 520 | 1200+ | 1200+ | 1200+ | 1050 |
| Completed Compound: | | | | | | | | |
| @ 300% Elong., MPa | — | 0.16 | 0.31 | 0.43 | 0.24 | 0.39 | 0.45 | 0.59 |
| @ Break, MPa | 0.06 | 0.27 | 0.64 | 1.02 | 0.13 | 0.46 | 0.61 | 1.10 |
| % Elongation | 240 | 1130 | 670 | 550 | 700 | 1200+ | 1200+ | 1050 |
| Lupke Rebound, 5th Rebound | 30.5 | 38.5 | 39.5 | 37.5 | 13 | 15 | 15.5 | 16 |
| Tension Set, % | | | | | | | | |
| Masterbatch | 68 | 42 | 50 | 39.5 | 29.0 | 15.5 | 17.0 | 14.0 |
| Completed Compound | 81 | 47.5 | 48.5 | 36 | 31.5 | 17.5 | 15.5 | 13.0 |

The results in Table IV indicate that 1,2-napthoquinone is effective in improving the properties of diene polymers other than synthetic polyisoprene. Also, when used in combination with maleic acid or anhy-

TABLE III

| | Green Strength, MPa | | | | Tension Set, % | | Lupke Rebound |
|---|---|---|---|---|---|---|---|
| | Masterbatch | | Stock | | | | 5th Rebound |
| Test Compound | 300% El. | Break | 300% El. | Break | Masterbatch | Stock | |
| 9,10-Phenanthrenequinone | 0.18 | 0.15 | 0.24 | 0.34 | 49 | 46.5 | 21.5 |
| Tetrachloro-o-benzoquinone | 0.30 | 0.62 | 0.24 | 0.41 | 31 | 38 | 22.5 |
| 2-Hydroxy-1,4-naphthoquinone | 0.26 | 0.63 | 0.21 | 0.42 | 44 | 51 | 19 |
| 2,5-Dihydroxy-3,6-dichloro-p-benzoquinone | 0.32 | 0.68 | 0.19 | 0.18 | 38.5 | 49 | 25 |
| Acenaphthenequinone | 0.20 | 0.16 | 0.20 | 0.19 | 56 | 55 | 16.5 |
| 9,10-Anthroquinone | 0.19 | 0.14 | 0.18 | 0.14 | 58 | 58 | 20.5 |
| 1,4-Naphthoquinone | 0.18 | 0.14 | 0.14 | 0.08 | 63 | 60 | 22.5 |
| 1,2-Dihydroxy-9,10-anthroquinone | 0.17 | 0.14 | 0.19 | 0.18 | 52 | 51 | 18.5 |
| Control (range) | 0.17 to 0.23 | 0.13 to 0.21 | 0.14 to 0.19 | 0.08 to 0.19 | 56–59 | 56–63 | 19–22 |

It can be seen, based on the data in Table III, that the first four listed test compounds (which are within the scope of the invention) are all effective, in varying degrees, to improve the properties of the rubber.

dride, very good green strengths can be obtained with 1,2-naphthoquinone in an SBR compound.

EXAMPLE V

Natural and synthetic polyisoprene, and blends of the two polymers are tested, using 2,5-dihydroxy-p-benzoquinone together with maleic acid. Formulations include 100% natural and 100% synthetic polyisoprene, and 50/50 and 75/25 blends of synthetic/natural, and the remaining ingredients are the same as those in Example I, as is the mixing procedure.

Proportions and test results are set forth in Table V.

From the results shown in Table V it is seen that the combination of 0.8 parts maleic acid and 0.4 parts 2,5-dihydroxy-p-benzoquinone is effective to improve the properties of synthetic polyisoprene and a blend of 75/25 synthetic polyisoprene/natural rubber up to those of natural. The presence of a small (0.1 part) amount of sulfur also has a beneficial effect.

TABLE V

| STOCK | P | Q | R | S | T | U | V | W |
|---|---|---|---|---|---|---|---|---|
| Natural Rubber | 100.0 | 50.0 | — | — | — | 25.0 | → | → |
| Natsyn | — | 50.0 | 100.0 | → | → | 75.0 | → | → |
| Maleic Acid | — | — | — | 0.8 | → | — | 0.8 | → |
| 2,5-Dihydroxy-p-benzoquinone | — | — | — | 0.4 | → | — | 0.4 | → |
| Sulfur | — | — | — | — | 0.1 | — | — | 0.1 |
| Sulfur | 2.0 | → | → | → | → | → | → | → |
| Accelerator | 0.8 | → | → | → | → | → | → | → |
| Banbury Dump Temp., °C. | 199 | 200 | 202 | 204 | 207 | 204 | 202 | 207 |
| Green Strength Masterbatch | | | | | | | | |
| @ 300% Elongation, MPa | 0.39 | 0.31 | 0.18 | 0.37 | 0.56 | 0.25 | 0.40 | 0.44 |
| @ Break, MPa | 1.12 | 0.62 | 0.16 | 1.01 | 1.20 | 0.39 | 1.04 | 1.08 |
| Elongation at Break | 640 | 760 | 1200+ | 700 | 540 | 1060 | 660 | 640 |
| Complete Compound | | | | | | | | |
| @ 300% Elongation, MPa | 0.36 | 0.25 | 0.17 | 0.31 | 0.51 | 0.20 | 0.33 | 0.48 |
| @ Break, MPa | 0.85 | 0.50 | 0.15 | 0.83 | 1.29 | 0.30 | 0.91 | 1.13 |
| Elongation at Break | 590 | 830 | 1200+ | 640 | 550 | 1000 | 700 | 550 |
| Lupke Rebound, 5th Rebound | 25 | 19.5 | 17.5 | 25.5 | 25.5 | 19 | 21 | 25 |
| Tension Set, % | | | | | | | | |
| Masterbatch | 42 | 43.5 | 51.5 | 30 | 21.5 | 44 | 34 | 27.5 |
| Complete Compound | 41 | 43.5 | 55 | 29.5 | 22 | 52 | 32.5 | 24.0 |

The method of the invention has been shown to provide improved diene rubber compositions, useful in manufacturing tires, belts, hose and other products.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A method for improving properties of diene rubber comprising incorporating into the rubber, with good dispersion, from 0.1 to 20 parts by weight per 100 parts of the rubber by weight of a compound selected from diketo compounds wherein the keto groups are in the ortho positions of a 6-carbon hydrocarbon ring containing at least one site of carbon-to-carbon unsaturation, or tautomers of said compounds, at an appropriate temperature above 130° C. for from 0.1 to 20 minutes.

2. The method of claim 1 wherein the treatment temperature is at least 150° C.

3. The method of claim 2 wherein the treatment time is from 1 to 10 minutes, the treatment temperature is from 160° to 210° C. and the compound is present in the amount of from 0.2 to 5 parts by weight per 100 parts diene rubber by weight.

4. The method of claim 3 wherein the compound contains one or more chlorine substituents on the hydrocarbon ring.

5. The method of claim 3 wherein the compound contains one or more hydroxyl substituents on the hydrocarbon ring.

6. The method of claim 3 wherein the compound contains one or more additional hydrocarbon rings fused thereto.

7. The method of claim 3 wherein the compound is 1,2-naphthoquinone.

8. The method of claim 3 wherein the compound is tetrachloro-o-benzoquinone.

9. The method of claim 3 wherein the compound is 2-hydroxyl-1,4-naphthoquinone.

10. The method of claim 3 wherein the compound is 2,5-dihydroxy-p-benzoquinone.

11. The method of claim 3 wherein the compound is 9,10-phenanthrenequinone.

12. The method of claim 3 wherein the diene rubber is polyisoprene.

13. The method of claim 12 wherein the polyisoprene is synthetic.

14. The method of claim 3 wherein the diene rubber is SBR.

15. The method of claim 3 wherein the diene rubber is a blend of natural rubber and synthetic polyisoprene.

16. The method of claim 3 wherein from 0.2-5 parts of maleic acid by weight per 100 parts of diene rubber by weight is present.

17. The method of claim 3 wherein from 0.2-5 parts of maleic anhydride by weight per 100 parts of diene rubber by weight is present.

18. The method of claim 3 wherein from 0.1-0.5 part of sulfur by weight per 100 parts of diene rubber by weight is present.

19. The method of claim 3 wherein from 0.1-1.0 part of a vulcanization accelerator by weight per 100 parts of diene rubber by weight is present.

20. The method of claim 7 wherein the diene rubber is synthetic polyisoprene.

21. The method of claim 20 wherein from 0.2-5 parts of maleic acid by weight per 100 parts of diene rubber by weight is present.

22. The method of claim 20 wherein from 0.2–5 parts of maleic anhydride by weight per 100 parts of diene rubber by weight is present.

23. The method of claim 9 wherein the polymer is synthetic polyisoprene.

24. The method of claim 3 wherein the treatment comprises mastication.

25. The method of claim 24 wherein from 10 to 1000 parts by weight of diene rubber are added after the treatment.

26. A modified rubber composition which is the product of the reaction of a diene rubber and from 0.1 to 20 parts by weight per 100 parts of diene rubber by weight of a compound selected from diketo compounds wherein the keto groups are in the ortho positions of a 6-carbon hydrocarbon ring containing at least one site of carbon-to-carbon unsaturation, or tautomers of said compounds.

27. The composition of claim 26 wherein the compound is present in the amount of from 0.2 to 5 parts by weight per 100 parts of diene rubber by weight.

28. The composition of claim 26 wherein the compound is 1,2-naphthoquinone and the diene rubber is synthetic polyisoprene.

29. The composition of claim 26 wherein from 0.2–5 parts of maleic acid or maleic anhydride by weight per 100 parts of diene rubber by weight is also present.

30. The composition of claim 26 wherein from 0.1 to 0.5 part of sulfur by weight per 100 parts of diene rubber by weight is also present.

31. The composition of claim 26 wherein the compound is 2,5-dihydroxy-p-benzoquinone and the diene rubber is synthetic polyisoprene.

32. The composition of claim 31 wherein from 0.2–5 parts of maleic acid or maleic anhydride by weight per 100 parts by weight of diene rubber is also present.

33. The composition of claim 31 wherein from 0.1 to 0.5 part of sulfur by weight per 100 parts diene rubber by weight is also present.

34. The composition of claim 26 to which is added a vulcanization system, antidegradant, carbon black and zinc oxide.

35. Vulcanized composition of claim 34.

* * * * *